United States Patent
Guo et al.

(10) Patent No.: US 10,735,658 B2
(45) Date of Patent: Aug. 4, 2020

(54) IMAGING DEVICE, AND METHOD AND APPARATUS FOR CONTROLLING THE IMAGING DEVICE

(71) Applicant: SZ DJI OSMO TECHNOLOGY CO., LTD., Shenzhen (CN)

(72) Inventors: Zhuo Guo, Shenzhen (CN); Paul Pan, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/014,829

(22) Filed: Jun. 21, 2018

(65) Prior Publication Data

US 2018/0302570 A1 Oct. 18, 2018

Related U.S. Application Data

(63) Continuation of application No. PCT/CN2015/098322, filed on Dec. 22, 2015.

(51) Int. Cl.
*H04N 5/232* (2006.01)
*G03B 17/56* (2006.01)
(Continued)

(52) U.S. Cl.
CPC .......... *H04N 5/23296* (2013.01); *G02B 7/10* (2013.01); *G03B 17/561* (2013.01);
(Continued)

(58) Field of Classification Search
CPC ............ H04N 5/23296; H04N 5/2251; H04N 5/23203; H04N 5/2328; G02B 7/10;
(Continued)

(56) References Cited

U.S. PATENT DOCUMENTS 5,065,249 A * 11/1991 Horn ............... F16M 11/10
348/375
6,007,259 A * 12/1999 Mori ............... F16M 11/28
248/168
(Continued)

FOREIGN PATENT DOCUMENTS

CN 201904848 U 7/2011
CN 104469292 A 3/2015
(Continued)

OTHER PUBLICATIONS

The World Intellectual Property Organization (WIPO) International Search Report for PCT/CN2015/098322 dated Sep. 22, 2016 6 Pages (including translation).

*Primary Examiner* — Pritham D Prabhakher
(74) *Attorney, Agent, or Firm* — Anova Law Group, PLLC

(57) ABSTRACT

A method of controlling an imaging device having a function extension button includes obtaining attitude information of the imaging device or detecting triggering of one or more other buttons of the imaging device in response to the function extension button being triggered, and controlling the imaging device to perform an extended function. If the obtained attitude information is preset attitude information, the extended function is based upon a combination of the function extension button and the obtained attitude information. If the one or more other buttons is detected to be triggered, the extended function is based upon a combination of the function extension button and the one or more other buttons.

11 Claims, 5 Drawing Sheets

(51) Int. Cl.
  *G02B 7/10* (2006.01)
  *H04N 5/225* (2006.01)
(52) U.S. Cl.
  CPC ......... *G03B 17/563* (2013.01); *H04N 5/2251* (2013.01); *H04N 5/23203* (2013.01); *H04N 5/2328* (2013.01)
(58) Field of Classification Search
  CPC .... G03B 17/561; G03B 17/563; F16M 11/14; F16M 11/18; F16M 11/28; F16M 13/04; F16M 2200/022
  USPC .................................................. 348/207.99
  See application file for complete search history.

(56) References Cited

U.S. PATENT DOCUMENTS

| | | | | |
|---|---|---|---|---|
| 6,158,089 | A * | 12/2000 | Monahan | B25G 1/04 16/405 |
| 6,211,903 | B1 * | 4/2001 | Bullister | H04N 7/142 348/14.01 |
| 6,384,863 | B1 * | 5/2002 | Bronson | H04N 5/2251 348/208.99 |
| 6,707,501 | B1 | 3/2004 | McKay et al. | |
| 7,684,694 | B2 * | 3/2010 | Fromm | F16M 11/14 396/376 |
| 8,757,901 | B2 * | 6/2014 | Fromm | G03B 17/561 396/428 |
| 9,049,358 | B2 * | 6/2015 | Miller | H04N 5/2251 |
| 10,471,902 | B2 * | 11/2019 | Fischer | B60R 11/0235 |
| 2006/0257137 | A1 * | 11/2006 | Fromm | F16M 11/18 396/420 |
| 2006/0257138 | A1 * | 11/2006 | Fromm | F16M 13/04 396/420 |
| 2007/0053680 | A1 * | 3/2007 | Fromm | F16M 11/14 396/420 |
| 2007/0177866 | A1 * | 8/2007 | Fujimoto | G03B 17/38 396/376 |
| 2009/0003822 | A1 * | 1/2009 | Tyner | F16M 11/32 396/428 |
| 2009/0257741 | A1 * | 10/2009 | Greb | F16M 13/04 396/55 |
| 2010/0079101 | A1 * | 4/2010 | Sidman | F16M 11/041 318/649 |
| 2012/0081670 | A1 * | 4/2012 | Greaves | F16M 11/046 352/243 |
| 2012/0106941 | A1 * | 5/2012 | Greaves | F16M 11/046 396/421 |
| 2013/0176412 | A1 * | 7/2013 | Chen | H04N 7/183 348/77 |
| 2014/0027596 | A1 * | 1/2014 | Chang | A45F 5/00 248/333 |
| 2014/0037281 | A1 * | 2/2014 | Carney | G03B 17/561 396/421 |
| 2014/0055618 | A1 * | 2/2014 | Myers | F16M 11/14 348/158 |
| 2014/0168890 | A1 * | 6/2014 | Barnard | G06F 1/1626 361/679.55 |
| 2014/0191094 | A1 * | 7/2014 | Esarey | G03B 17/561 248/170 |
| 2014/0211975 | A1 * | 7/2014 | Roberts | G03B 17/561 381/361 |
| 2014/0354839 | A1 * | 12/2014 | Yu | H04N 5/23203 348/211.99 |
| 2015/0071627 | A1 * | 3/2015 | Hoang | F16M 13/00 396/421 |
| 2015/0078737 | A1 * | 3/2015 | Albonico | F16M 11/2014 396/48 |
| 2015/0261070 | A1 * | 9/2015 | Feng | G03B 17/561 396/421 |
| 2015/0281525 | A1 * | 10/2015 | Thakur | H04N 5/2251 348/376 |
| 2015/0312448 | A1 * | 10/2015 | Stark | F16M 13/02 348/374 |
| 2016/0171330 | A1 * | 6/2016 | Mentese | G06K 9/3233 348/170 |
| 2016/0246162 | A1 * | 8/2016 | Niemeyer | F16M 11/18 |
| 2016/0306264 | A1 * | 10/2016 | Chu | F16M 11/14 |
| 2017/0225624 | A1 * | 8/2017 | Fischer | F16M 11/2014 |

FOREIGN PATENT DOCUMENTS

| | | |
|---|---|---|
| CN | 104780298 A | 7/2015 |
| CN | 204733257 U | 10/2015 |
| CN | 105049709 A | 11/2015 |
| CN | 105090695 A | 11/2015 |
| CN | 205249356 U | 5/2016 |

\* cited by examiner

IMAGING DEVICE, AND METHOD AND APPARATUS FOR CONTROLLING THE IMAGING DEVICE

CROSS-REFERENCE TO RELATED APPLICATION

This application is a continuation of International Application No. PCT/CN2015/098322, filed on Dec. 22, 2015, the entire contents of which are incorporated herein by reference.

TECHNICAL FIELD

The present disclosure relates to a controlling of an imaging device, and more particularly to an imaging device, and a method and an apparatus for controlling the imaging device.

BACKGROUND OF THE DISCLOSURE

Functions of a camera can be extended by a software or hardware upgrade. A camera is generally provided with limited and fixed number of physical buttons. A user has to perform additional operations to switch between functions of the camera if extended functions are to be effected with the original physical buttons. The camera operation is complicated and inefficient, and the user experience is degraded. As a result, no function extension is provided to a camera product once it is offered, leading the camera product less dominant and attractive. User's desire for continuous upgrades of the product is not satisfied.

A handheld gimbal can be compact and easy to carry, and can carry a compact camera or a smart phone. The handheld gimbal can control imaging-related functions of the camera and rapidly stabilize an imaging device in movement to maintain the imaging device at a determined attitude. However, existing handheld gimbals can only control limited functions of camera such as an imaging, a recording or an imaging mode switching among other camera functions.

SUMMARY OF THE DISCLOSURE

There is a need for an imaging device, and a method and an apparatus for controlling the imaging device to overcome the above technical problems.

An aspect of the present disclosure discloses a method of controlling an imaging device, the imaging device being provided with a function extension button, the method comprising:

obtaining attitude information of the imaging device or detecting a triggering of one or more other buttons of the imaging device if the function extension button is triggered;

controlling the imaging device to perform an extended function based upon a combination of the function extension button and the obtained attitude information if the obtained attitude information of the imaging device is preset attitude information; or controlling the imaging device to perform an extended function based upon a combination of the function extension button and the one or more other buttons if the one or more other buttons are detected to be triggered.

In some embodiments, the method can further comprise: controlling the imaging device to perform an extended function based upon a preset correspondence between (1) a combination of the function extension button and each of at least one type of preset attitude information and (2) extended functions of the imaging device, or a preset correspondence between (1) a combination of the function extension button and each of at least one other button of the imaging device and (2) extended functions of the imaging device.

In some embodiments, the method can comprise: adjusting an operating parameter of the imaging device based upon a combination of the function extension button and the obtained attitude information.

In some embodiments, the imaging device can comprise a gimbal and a camera provided on the gimbal. The at least one type of preset attitude information of the imaging device can comprise at least one of a rotation angle of the gimbal about a pitch axis, a rotation angle of the gimbal about a roll axis, or a rotation angle of the gimbal about a yaw axis.

Adjusting the operating parameter of the imaging device based upon the combination of the function extension button and the obtained attitude information can comprise:

adjusting a first operating parameter of the imaging device based upon a combination of the function extension button and the obtained rotation angle of the gimbal about the pitch axis if the obtained attitude information is the rotation angle of the gimbal about the pitch axis; and/or adjusting a second operating parameter of the imaging device based upon a combination of the function extension button and the obtained rotation angle of the gimbal about the roll axis if the obtained attitude information is the rotation angle of the gimbal about the roll axis; and/or adjusting a third operating parameter of the imaging device based upon a combination of the function extension button and the obtained rotation angle of the gimbal about the yaw axis if the obtained attitude information is the rotation angle of the gimbal about the yaw axis.

Each of the first operating parameter, the second operating parameter and the third operating parameter can be a focal length of the camera, an optical/digital zooming parameter, an aperture parameter, a shutter speed or a sensitivity. The first operating parameter, the second operating parameter and the third operating parameter can be different from one another.

In some embodiments, the at least one other button of the imaging device can comprise at least one of a shutter button, a record button or a joystick. The method can further comprise:

enabling or disabling a first specific function of the imaging device based upon a combination of the function extension button and the shutter button if the shutter button is triggered; and/or enabling or disabling a second specific function of the imaging device based upon a combination of the function extension button and the record button if the record button is triggered; and/or adjusting an operating parameter of the imaging device based upon a combination of the function extension button and the joystick if the joystick is triggered.

Each of the first specific function and the second specific function can be a flashlight, a shutter, a filter or a facial recognition of the camera. The first specific function and the second specific function can be different from each other.

In some embodiments, the joystick can comprise an up button, a down button, a left button and a right button.

Adjusting the operating parameter of the imaging device based upon the combination of the function extension button and the joystick can comprise:

increasing or decreasing a fourth operating parameter of the imaging device based upon a combination of the function extension button and the up button of the joystick if the up button of the joystick is triggered; and/or decreasing or increasing the fourth operating parameter of the imaging device based upon a combination of the function extension button and the down button of the joystick if the down button of the joystick is triggered; and/or increasing or decreasing a fifth operating parameter of the imaging device based upon a combination of the function extension button and the left button of the joystick if the left button of the joystick is triggered; and/or decreasing or increasing the fifth operating parameter of the imaging device based upon a combination of the function extension button and the right button of the joystick if the right button of the joystick is triggered.

Each of the fourth operating parameter and the fifth operating parameter can the focal length of the camera, the optical/digital zooming parameter, the aperture parameter, the shutter speed or the sensitivity. The fourth operating parameter and the fifth operating parameter can be different from each other.

In some embodiments, the method can further comprise:

controlling the imaging device to perform an extended function based upon a combination of the function extension button and the obtained attitude information or a combination of the function extension button and the one or more other buttons if the function extension button is triggered and meanwhile the preset attitude information of the imaging device is obtained or the one or more other buttons are detected to be triggered.

In some embodiments, the method can further comprise:

switching a control mode of the imaging device to a function extension mode after the function extension button is triggered; and when the imaging device is in the function extension mode, controlling the imaging device to perform an extended function based upon a combination of the function extension button and the obtained attitude information or a combination of the function extension button and the one or more other buttons if the preset attitude information of the imaging device is obtained or the one or more other buttons are detected to be triggered.

In some embodiments, the function extension button can be a button having a single button function; or the function extension button can be a multi-function button having multiple button functions. The method can further comprise:

setting a specific trigger mode for triggering a function extension button function of the multi-function button; and setting a preset trigger mode for triggering a regular button function of the multi-function button.

In some embodiments, controlling the imaging device to perform an extended function can comprise controlling the camera of the imaging device to perform an extended function; and/or obtaining the attitude information of the imaging device can comprise obtaining attitude information of the gimbal of the imaging device.

Another aspect of the disclosure discloses an apparatus for controlling an imaging device, the apparatus comprising:

a function extension button provided at the imaging device;

an attitude acquisition device configured to detect attitude information of the imaging device; and a controller configured to detect a triggering of one or more other buttons of the imaging device or to obtain the attitude information of the imaging device detected by the attitude acquisition device if the function extension button is triggered.

The controller can be further configured to control the imaging device to perform an extended function based upon a combination of the function extension button and the obtained attitude information if the obtained attitude information of the imaging device is preset attitude information, or, the controller can be further configured to control the imaging device to perform an extended function based upon a combination of the function extension button and the one or more other buttons if the one or more other buttons are detected to be triggered.

In some embodiments, the controller can control the imaging device to perform an extended function based upon a preset correspondence between (1) a combination of the function extension button and each of at least one type of preset attitude information and (2) extended functions of the imaging device, or a preset correspondence between (1) a combination of the function extension button and each of at least one other button of the imaging device and (2) extended functions of the imaging device.

In some embodiments, the controller can be configured to adjust an operating parameter of the imaging device based upon a combination of the function extension button and the obtained attitude information.

In some embodiments, the imaging device can comprise a gimbal and a camera provided on the gimbal. The at least one type of preset attitude information of the imaging device can comprise at least one of a rotation angle of the gimbal about a pitch axis, a rotation angle of the gimbal about a roll axis, or a rotation angle of the gimbal about a yaw axis.

The controller can be configured to adjust a first operating parameter of the imaging device based upon a combination of the function extension button and the obtained rotation angle of the gimbal about the pitch axis if the obtained attitude information is the rotation angle of the gimbal about the pitch axis; and/or the controller can be configured to adjust a second operating parameter of the imaging device based upon a combination of the function extension button and the obtained rotation angle of the gimbal about the roll axis if the obtained attitude information is the rotation angle of the gimbal about the roll axis; and/or the controller can be configured to adjust a third operating parameter of the imaging device based upon a combination of the function extension button and the obtained rotation angle of the gimbal about the yaw axis if the obtained attitude information is the rotation angle of the gimbal about the yaw axis.

Each of the first operating parameter, the second operating parameter and the third operating parameter can be a focal length of the camera, an optical/digital zooming parameter, an aperture parameter, a shutter speed or a sensitivity. The first operating parameter, the second operating parameter and the third operating parameter can be different from one another.

In some embodiments, the at least one other button of the imaging device can comprise at least one of a shutter button, a record button or a joystick.

The controller can be configured to enable or disable a first specific function of the imaging device based upon a combination of the function extension button and the shutter button if the shutter button is triggered; and/or the controller can be configured to enable or disable a second specific function of the imaging device based upon a combination of the function extension button and the record button if the record button is triggered; and/or the controller can be configured to adjust an operating parameter of the imaging device based upon a combination of the function extension button and the joystick if the joystick is triggered.

Each of the first specific function and the second specific function can be a flashlight, a shutter, a filter, or a facial recognition of the camera. The first specific function and the second specific function can be different from each other.

In some embodiments, the joystick can comprise an up button, a down button, a left button and a right button.

The controller can be configured to increase or decrease a fourth operating parameter of the imaging device based upon a combination of the function extension button and the up button of the joystick if the up button of the joystick is triggered; and/or the controller can be configured to decrease or increase the fourth operating parameter of the imaging device based upon a combination of the function extension button and the down button of the joystick if the down button of the joystick is triggered; and/or the controller can be configured to increase or decrease a fifth operating parameter of the imaging device based upon a combination of the function extension button and the left button of the joystick if the left button of the joystick is triggered; and/or the controller can be configured to decrease or increase the fifth operating parameter of the imaging device based upon a combination of the function extension button and the right button of the joystick if the right button of the joystick is triggered.

Each of the fourth operating parameter and the fifth operating parameter can be the focal length of the camera, the optical/digital zooming parameter, the aperture parameter, the shutter speed or the sensitivity. The fourth operating parameter and the fifth operating parameter can be different from each other.

In some embodiments, the controller can be configured to control the imaging device to perform an extended function based upon a combination of the function extension button and the obtained attitude information or a combination of the function extension button and the one or more other buttons if the function extension button is triggered and meanwhile the preset attitude information of the imaging device is obtained or the one or more other buttons are detected to be triggered.

In some embodiments, the controller can be further configured to switch a control mode of the imaging device to a function extension mode after the function extension button is triggered. When the imaging device is in the function extension mode, the controller can be further configured to control the imaging device to perform an extended function based upon a combination of the function extension button and the obtained attitude information or a combination of the function extension button and the one or more other buttons if the preset attitude information of the imaging device is obtained or the one or more other buttons are detected to be triggered.

In some embodiments, the imaging device can comprise a gimbal and a camera provided on the gimbal. One or more of the function extension button, the attitude acquisition device and the controller can be provided at the gimbal; or one or more of the function extension button, the attitude acquisition device and the controller can be provided at the camera.

In some embodiments, the attitude acquisition device can be an inertial measurement unit (IMU) comprising a gyroscope and an angular velocity meter.

In some embodiments, the function extension button can be a button having a single button function; or the function extension button can be a multi-function button having multiple button functions configured to receive a specific trigger mode for triggering a function extension button function and a preset trigger mode for triggering a regular button function.

In some embodiments, the controller can be configured to control the camera of the imaging device to perform an extended function; and/or the attitude acquisition device can be configured to detect attitude information of the gimbal of the imaging device.

Another aspect of the present disclosure discloses an imaging device, comprising a gimbal, a camera and a control apparatus. The camera can be provided on the gimbal. The control apparatus can comprise:

a function extension button;

an attitude acquisition device configured to detect attitude information of the imaging device; and a controller configured to detect a triggering of one or more other buttons of the imaging device or to obtain the attitude information of the imaging device detected by the attitude acquisition device if the function extension button is triggered.

The controller can be further configured to control the imaging device to perform an extended function based upon a combination of the function extension button and the obtained attitude information if the obtained attitude information of the imaging device is preset attitude information, or, the controller can be further configured to control the imaging device to perform an extended function based upon a combination of the function extension button and the one or more other buttons if the one or more other buttons are detected to be triggered.

In some embodiments, the controller can control the imaging device to perform an extended function based upon a preset correspondence between (1) a combination of the function extension button and each of at least one type of preset attitude information and (2) extended functions of the imaging device, or a preset correspondence between (1) a combination of the function extension button and each of at least one other button of the imaging device and (2) extended functions of the imaging device.

In some embodiments, the controller can be configured to adjust an operating parameter of the imaging device based upon a combination of the function extension button and the obtained attitude information.

In some embodiments, the at least one type of preset attitude information of the imaging device can comprise at least one of a rotation angle of the gimbal about a pitch axis, a rotation angle of the gimbal about a roll axis, or a rotation angle of the gimbal about a yaw axis.

The controller can be configured to adjust a first operating parameter of the imaging device based upon a combination of the function extension button and the obtained rotation angle of the gimbal about the pitch axis if the obtained attitude information is the rotation angle of the gimbal about the pitch axis; and/or the controller can be configured to adjust a second operating parameter of the imaging device based upon a combination of the function extension button and the obtained rotation angle of the gimbal about the roll axis if the obtained attitude information is the rotation angle of the gimbal about the roll axis; and/or the controller can be configured to adjust a third operating parameter of the imaging device based upon a combination of the function extension button and the obtained rotation angle of the gimbal about the yaw axis if the obtained attitude information is the rotation angle of the gimbal about the yaw axis.

Each of the first operating parameter, the second operating parameter and the third operating parameter can be a focal length of the camera, an optical/digital zooming parameter, an aperture parameter, a shutter speed or a sensitivity. The first operating parameter, the second operating parameter and the third operating parameter can be different from one another.

In some embodiments, the at least one other button of the imaging device can comprise at least one of a shutter button, a record button or a joystick.

The controller can be configured to enable or disable a first specific function of the imaging device based upon a combination of the function extension button and the shutter button if the shutter button is triggered; and/or the controller can be configured to enable or disable a second specific function of the imaging device based upon a combination of the function extension button and the record button if the record button is triggered; and/or the controller can be configured to adjust an operating parameter of the imaging device based upon a combination of the function extension button and the joystick if the joystick is triggered.

Each of the first specific function and the second specific function can be a flashlight, a shutter, a filter, or a facial recognition of the camera. The first specific function and the second specific function can be different from each other.

In some embodiments, the joystick can comprise an up button, a down button, a left button and a right button.

The controller can be configured to increase or decrease a fourth operating parameter of the imaging device based upon a combination of the function extension button and the up button of the joystick if the up button of the joystick is triggered; and/or the controller can be configured to decrease or increase the fourth operating parameter of the imaging device based upon a combination of the function extension button and the down button of the joystick if the down button of the joystick is triggered; and/or the controller can be configured to increase or decrease a fifth operating parameter of the imaging device based upon a combination of the function extension button and the left button of the joystick if the left button of the joystick is triggered; and/or the controller can be configured to decrease or increase the fifth operating parameter of the imaging device based upon a combination of the function extension button and the right button of the joystick if the right button of the joystick is triggered.

Each of the fourth operating parameter and the fifth operating parameter can be the focal length of the camera, the optical/digital zooming parameter, the aperture parameter, the shutter speed or the sensitivity. The fourth operating parameter and the fifth operating parameter can be different from each other.

In some embodiments, the controller can be configured to control the imaging device to perform an extended function based upon a combination of the function extension button and the obtained attitude information or a combination of the function extension button and the one or more other buttons if the function extension button is triggered and meanwhile the preset attitude information of the imaging device is obtained or the one or more other buttons are detected to be triggered.

In some embodiments, the controller can be further configured to switch a control mode of the imaging device to a function extension mode after the function extension button is triggered. When the imaging device is in the function extension mode, the controller can be further configured to control the imaging device to perform an extended function based upon a combination of the function extension button and the obtained attitude information or a combination of the function extension button and the one or more other buttons if the preset attitude information of the imaging device is obtained or the one or more other buttons are detected to be triggered.

In some embodiments, one or more of the function extension button, the attitude acquisition device and the controller can be provided at the gimbal; or one or more of the function extension button, the attitude acquisition device and the controller can be provided at the camera.

In some embodiments, the attitude acquisition device can be an inertial measurement unit (IMU) comprising a gyroscope and an angular velocity meter.

In some embodiments, the function extension button can be a button having a single button function; or the function extension button can be a multi-function button having multiple button functions configured to receive a specific trigger mode for triggering a function extension button function and a preset trigger mode for triggering a regular button function.

In some embodiments, the controller can be configured to control the camera to perform an extended function; and/or the attitude acquisition device can be configured to obtain attitude information of the gimbal.

Additional control modes on additional functions of the imaging device can be provided using the apparatus for controlling the imaging device of the disclosure, in which a Fn button function mode is enabled by the function extension button, and the function extension button is combined with original physical buttons of the imaging device or with the attitude information of the imaging device (e.g., motion data of the imaging device). Additional functions of the imaging device can be invoked, and an efficiency of the original buttons of the imaging device can be improved. An operation of the imaging device can be simplified, thereby improving an user experience. Furthermore, an upgrade and a functional extension of the imaging device can be facilitated.

LIST OF REFERENCE NUMERALS

TABLE 1

| | |
|---|---|
| Imaging device | 10 |
| Gimbal | 20 |
| Handle | 21 |
| Stabilizing assembly | 22 |
| Mode switch button | 23 |
| Shutter button | 24 |
| Record button | 25 |
| Joystick | 26 |
| Camera | 30 |
| Imaging device | 400 |
| Gimbal | 41 |
| Camera | 42 |
| Control apparatus | 50 |
| Function extension button | 51 |
| Controller | 52 |
| Attitude acquisition device | 53 |
| Step | 101-106 |

The present disclosure will be described in the illustrative embodiments by reference to the drawings.

DETAILED DESCRIPTION OF THE EMBODIMENTS

A better understanding of the disclosure will be obtained by reference to the following detailed description that sets forth illustrative embodiments with reference to the drawings. It will be apparent that, the embodiments described herein are merely provided by way of example only. Those skilled in the art can conceive various embodiments in light of those embodiments disclosed herein without inventive efforts, and all these embodiments are within the scope of the disclosure.

Figure 1:
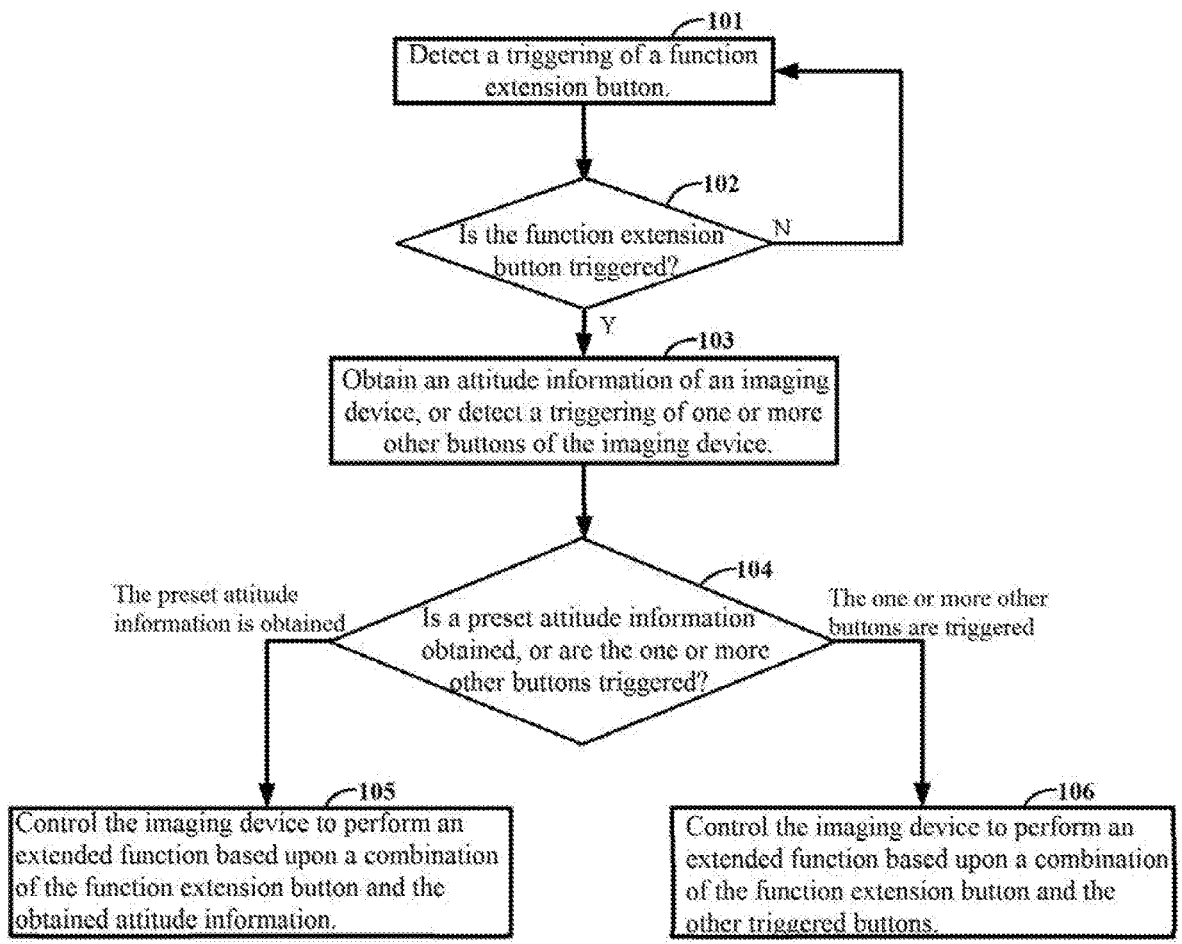
FIG. 1 shows a flowchart of a method of controlling an imaging device in accordance with embodiments of the disclosure.

FIG. 1 shows a flowchart of a method of controlling an imaging device in accordance with embodiments of the disclosure. In some embodiments, the imaging device can be an imaging device 10 shown in FIG. 2, which comprising a gimbal 20 and a camera 30 provided on the gimbal 20. A function extension button and at least one other button can be provided on at least one of the gimbal 20 and the camera 30. It will be appreciated that, the method as described in accordance with embodiments of the disclosure is not limited to the steps and sequence as shown in the flowchart of FIG. 1. In various embodiments, the steps shown in the flowchart of FIG. 1 can be added, removed, changed, or performed in different sequences. The method in accordance with embodiment of the disclosure can comprise steps 101 to 106.

In step 101, a triggering of the function extension button can be detected.

In some embodiments, the function extension button can be a button having a single button function.

Alternatively, the function extension button can be a multi-function button having multiple button functions including a function extension button function and a regular button function. In this case, the method can further comprise a process in which a specific trigger mode for triggering the function extension button function of the multi-function button and a preset trigger mode for triggering the regular button function of the multi-function button are set.

Figure 2:
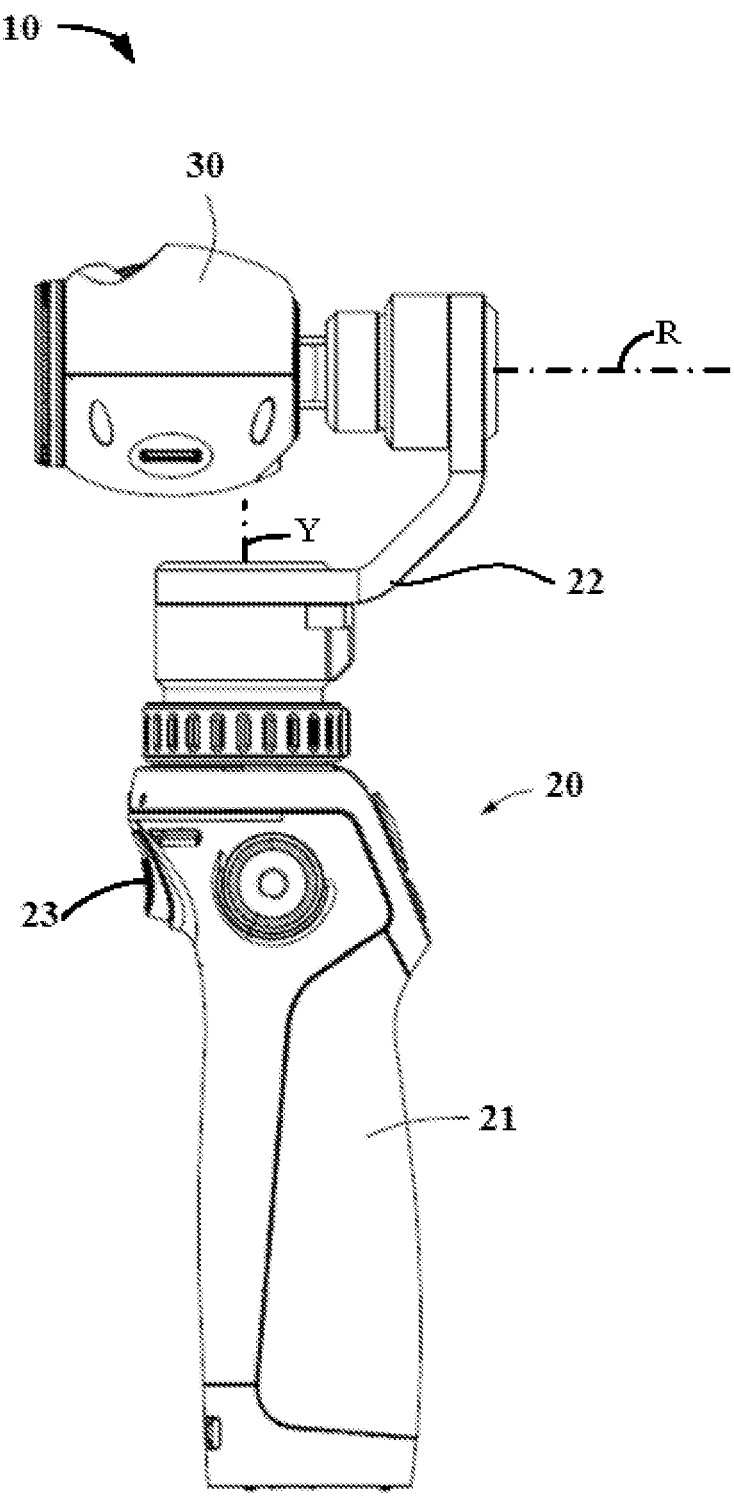
FIG. 2 shows a handheld gimbal in accordance with embodiments of the disclosure.

For example, the function extension button can be a mode switch button 23 (as shown in FIG. 2) provided on the gimbal 20. The regular button functions of the mode switch button 23 can comprise returning the gimbal to a neutral position, rotating the gimbal by 180 degrees to a selfie mode and locking an attitude of the gimbal. Accordingly, the preset trigger mode can be set as double-tapping the mode switch button 23, triple-tapping the mode switch button 23 or holding down the mode switch button 23.

The specific trigger mode can be different from the preset trigger mode. In some instances, the specific trigger mode can be set as tapping the mode switch button 23 multiple times, tapping the mode switch button 23 one or more times and then holding the mode switch button 23, or holding the mode switch button 23 multiple times, such that the regular button function can be distinguished from the function extension button function of the mode switch button 23. It will be appreciated that, various reasonable or convenient trigger modes can be set to trigger various button functions of the multi-function button according to actual operation requirements.

In step 102, a determination on whether the function extension button is triggered can be made. If the function extension button is triggered, then step 103 can be performed; otherwise, the processing can return to step 101.

In step 103, attitude information of the imaging device can be obtained, or a triggering of one or more other buttons of the imaging device can be detected.

In some instances, in the method in accordance with embodiments of the disclosure, the attitude information of the imaging device can be obtained by controlling an attitude acquisition device such as an inertial measurement unit (IMU) provided on the imaging device.

In step 104, a determination on whether the obtained attitude information of the imaging device is preset attitude information can be made. Alternatively, a determination on whether one or more other buttons are triggered can be made. If the obtained attitude information of the imaging device, for example attitude information of the gimbal of the imaging device, is the preset attitude information, then step 105 can be performed. If one or more other buttons are triggered, then step 106 can be performed.

In step 105, the imaging device, for example the camera of the imaging device, can be controlled to perform an extended function based upon a combination of the function extension button and the obtained attitude information.

In some embodiments, the method can control the imaging device to perform an extended function based upon a preset correspondence between (1) a combination of the function extension button and each of at least one type of preset attitude information of the imaging device and (2) extended functions of the imaging device.

Figure 3:
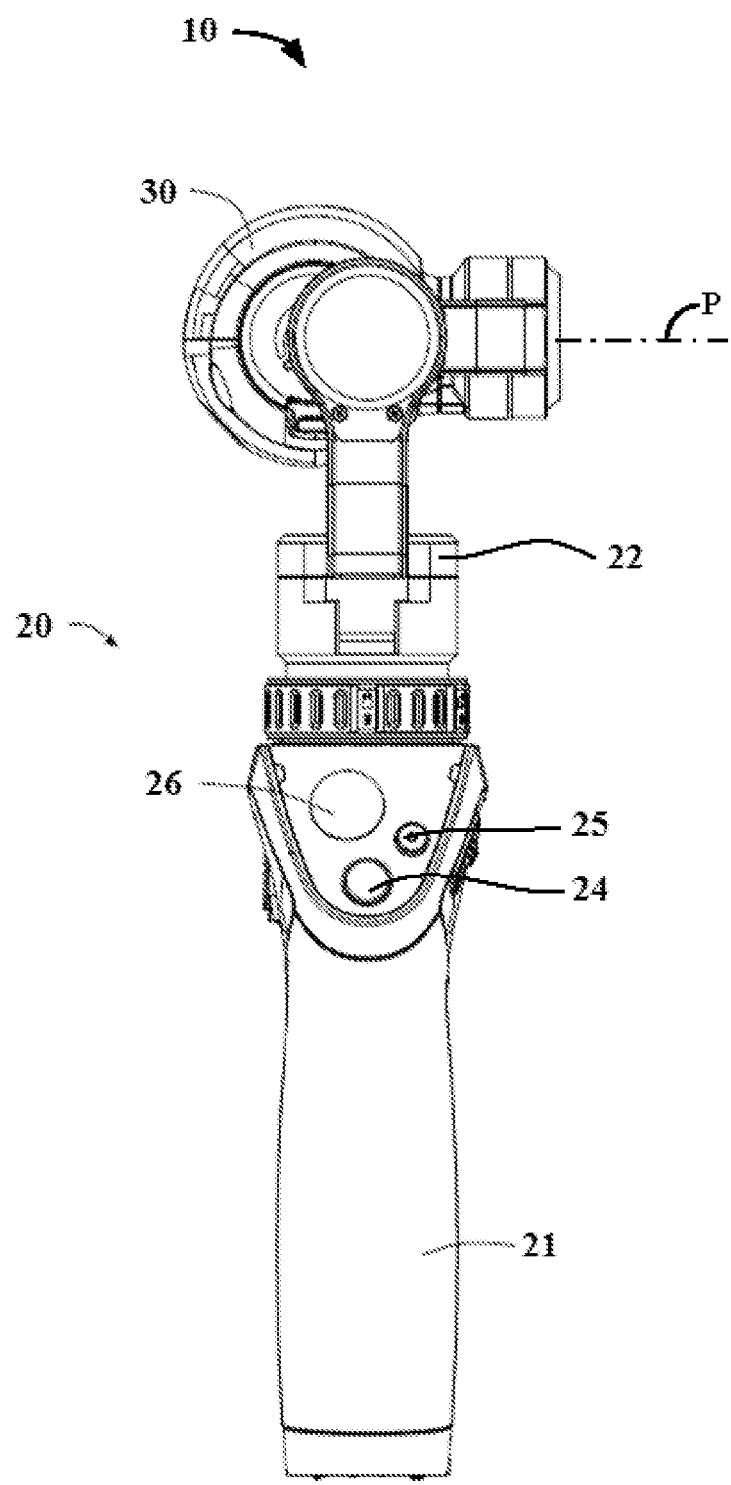
FIG. 3 shows the handheld gimbal of FIG. 2 from another point of view.

In some embodiments, the at least one type of preset attitude information of the imaging device can comprise at least one of a rotation angle of the gimbal about a pitch axis P (as shown in FIG. 3), a roll axis R (as shown in FIG. 2) or a yaw axis Y.

In some embodiments, the step 105 can comprise adjusting an operating parameter of the imaging device based upon a combination of the function extension button and the obtained attitude information.

In some instances, if the obtained attitude information is a rotation angle of the gimbal about the pitch axis, then a first operating parameter of the imaging device can be adjusted based upon a combination of the function extension button and the obtained rotation angle of the gimbal about the pitch axis. For example, if the gimbal is rotated clockwise about the pitch axis, then the first operating parameter of the camera of the imaging device can be increased or decreased. For example, if the gimbal is rotated counterclockwise about the pitch axis, then the first operating parameter of the camera of the imaging device can be decreased or increased.

Optionally, if the obtained attitude information is an angle of the gimbal about the roll axis, then a second operating parameter of the imaging device can be adjusted based upon a combination of the function extension button and the obtained rotation angle of the gimbal about the roll axis. For example, if the gimbal is rotated clockwise about the roll axis, then the second operating parameter of the camera of the imaging device can be increased or decreased. For example, if the gimbal is rotated counterclockwise about the roll axis, then the second operating parameter of the camera of the imaging device can be decreased or increased.

Optionally, if the obtained attitude information is an rotation angle of the gimbal about the yaw axis, then a third operating parameter of the imaging device can be adjusted based upon a combination of the function extension button and the obtained rotation angle of the gimbal about the yaw axis. For example, if the gimbal is rotated clockwise about the yaw axis, then the third operating parameter of the camera of the imaging device can be increased or decreased. For example, if the gimbal is rotated counterclockwise about the yaw axis, then the third operating parameter of the camera of the imaging device can be decreased or increased.

In some embodiments, the first operating parameter, the second operating parameter and the third operating parameter can each be a focal length of the camera, an optical/digital zooming parameter, an aperture parameter, a shutter speed or a sensitivity. The first operating parameter, the second operating parameter and the third operating parameter can be different from one another. In other embodiments, the first operating parameter, the second operating parameter and the third operating parameter can be other parameters of the camera.

In step 106, the imaging device (for example, the camera of the imaging device) can be controlled to perform an extended function based upon a combination of the function extension button and one or more other buttons being triggered.

In some embodiments, the method can control the imaging device to perform an extended function based upon a preset correspondence between (1) a combination of the function extension button and each of at least one other button of the imaging device and (2) extended functions of the imaging device.

In some embodiments, the at least one other button of the imaging device can comprise at least one of a shutter button, a record button or a joystick. As shown in FIG. 3, the shutter button, the record button and the joystick can be a shutter button 24, a record button 25 and a joystick 26 provided to the gimbal 20. In other embodiments, the shutter button, the record button and the joystick can be provided to the camera.

In some embodiments, the step 106 can comprise the following processes.

For instance, if the triggered button is the shutter button, then a first specific function of the imaging device can be enabled or disabled based upon a combination of the function extension button and the triggered shutter button.

Optionally, if the triggered button is the record button, then a second specific function of the imaging device can be enabled or disabled based upon a combination of the function extension button and the triggered record button.

In some embodiments, the first specific function and the second specific function can each be a flashlight, a shutter, a filter or a facial recognition of the camera. The first specific function and the second specific function can be different from each other. Alternatively, the first specific function and the second specific function can each be another function of the camera.

Optionally, if the triggered button is the joystick, then an operating parameter of the imaging device can be adjusted based upon a combination of the function extension button and the triggered joystick.

In some embodiments, the joystick can comprise an up button, a down button, a left button and a right button. In some instances, if the triggered button is the up button of the joystick, then a fourth operating parameter of the imaging device can be increased or decreased based upon a combination of the function extension button and the triggered up button of the joystick. Alternatively or additionally, if the triggered button is the down button of the joystick, then the fourth operating parameter of the imaging device can be decreased or increased based upon a combination of the function extension button and the triggered down button of the joystick. In this way, an operating parameter of the imaging device can be adjusted using the up button and the down button of the joystick collectively.

Optionally, if the triggered button is the left button of the joystick, then a fifth operating parameter of the imaging device can be increased or decreased based upon a combination of the function extension button and the triggered left button of the joystick. Alternatively or additionally, if the triggered button is the right button of the joystick, then the fifth operating parameter of the imaging device can be decreased or increased based upon a combination of the function extension button and the triggered right button of the joystick. In this way, an operating parameters of the imaging device can be adjusted using the left button and the right button of the joystick collectively.

In some instances, the fourth operating parameter and the fifth operating parameter can each be a focal length of the camera, an optical/digital zooming parameter, an aperture parameter, a shutter speed or a sensitivity. The fourth operating parameter and the fifth operating parameter can be different from each other. Alternatively, the fourth operating parameter and the fifth operating parameter can each be another parameter of the camera.

It will be appreciated that, the number of the button combination can be increased, and the extended functions of the imaging device can be accordingly set according to actual requirements. For example, the shutter button and the record button, or a combination of one or more other buttons, can be simultaneously pressed when the function extension button is triggered, such that more functions of the imaging device can be enabled or disabled, or more operating parameters of the imaging device can be adjusted.

In some embodiments, the method can comprise a process in which if the function extension button is triggered and meanwhile the preset attitude information of the imaging device is obtained or one or more other buttons are triggered, the imaging device can be controlled to perform an extended function based upon a combination of the function extension button and the obtained attitude information or a combination of the function extension button and the one or more other buttons. In other words, in order to control the imaging device to perform an extended function, the function extension button can be triggered and meanwhile an attitude of the imaging device can be altered. Alternatively, in order to control the imaging device to perform an extended function, the function extension button can be triggered and meanwhile one or more other buttons can be triggered.

Alternatively, the method can comprise a processing in which a control mode of the imaging device is switched to a function extension mode after the function extension button is triggered. When the imaging device is in the function extension mode, if the preset attitude information of the imaging device is obtained or one or more other buttons are triggered, then the imaging device can be controlled to perform an extended function based upon a combination of the function extension button and the obtained attitude information or a combination of the function extension button and the one or more other buttons. In other words, in order to control the imaging device to perform an extended function, the function extension button can be triggered and then released to enter the imaging device into the function extension mode. Then, an attitude of the imaging device can be altered or one or more other buttons can be triggered.

Additional control modes on additional functions of the imaging device can be provided using the method in accordance with embodiments of the disclosure, in which a Fn button function mode is enabled by the function extension button, and the function extension button is combined with original physical buttons of the imaging device or with the attitude information of the imaging device (e.g., motion data of the imaging device). Additional functions of the imaging device can be provided, and an utilization of the original buttons of the imaging device can be improved. An operation of the imaging device can be simplified, thereby improving an user experience. Furthermore, an upgrade and a functional extension of the imaging device can be facilitated.

Figure 4:
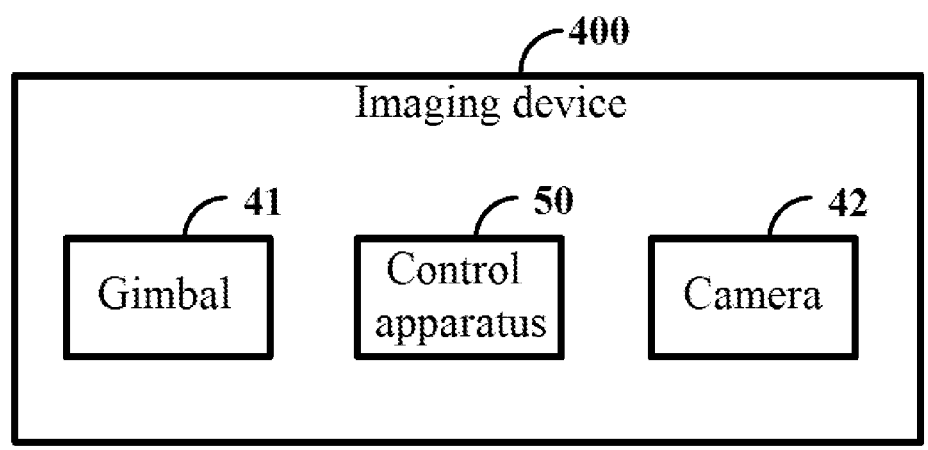
FIG. 4 shows a configuration of an imaging device in accordance with embodiments of the disclosure.

FIG. 4 shows a structure of an imaging device 400 in accordance with embodiments of the disclosure. The imaging device 400 can comprise a gimbal 41, a camera 42 and a control apparatus 50. In some instances, the camera 42 can be provided on the gimbal 41, and the control apparatus 50 can control an operation of the camera 42 provided on the gimbal 41.

The gimbal 41 can be a handheld gimbal, for example the handheld three-axis gimbal 20 as shown in FIG. 2. The gimbal 41 can comprise a handle 21 and a stabilizing assembly 22 coupled to an end of the handle. The camera 42 can be the camera 30 as shown in FIG. 2 which is mounted on the stabilizing assembly 22. In other embodiments, the gimbal 41 can be a handheld single-axis gimbal or a handheld two-axis gimbal. A contour of the camera 42 can be rectangular or other shapes.

Figure 5:
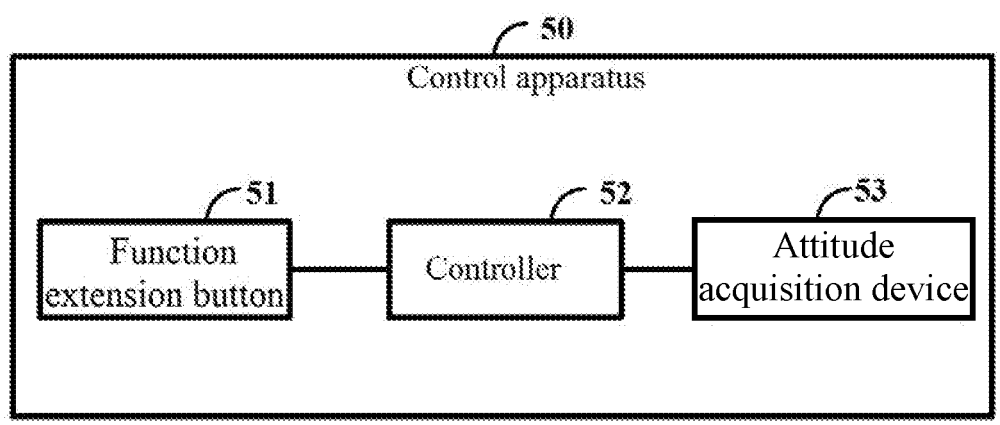
FIG. 5 shows a configuration of an apparatus for controlling the imaging device of FIG. 4.

FIG. 5 shows a configuration of a control apparatus 50 in accordance with embodiments of the disclosure. In some embodiments, the control apparatus 50 can comprise a function extension button 51, a controller 52 and an attitude acquisition device 53.

In some embodiments, the function extension button 51 can be a button having a single button function. Alternatively, the function extension button 51 can be a multi-function button having multiple button functions including a function extension button function and a regular button function. The multi-function button can receive a specific trigger mode to trigger the function extension button function, and receive a preset trigger mode to trigger the regular button function.

For example, the function extension button 51 can be a mode switch button which is originally provided at the gimbal 41, such as the mode switch button 23 shown in FIG. 2. A regular button function of the mode switch button 23 can comprise returning the gimbal to a neutral position, rotating the gimbal by 180 degrees to a selfie mode and locking an attitude of the gimbal. Accordingly, the preset trigger mode can be set as double-tapping the mode switch button 23, triple-tapping the mode switch button 23 or holding down the mode switch button 23.

The specific trigger mode can be different from the preset trigger mode. In some instances, the specific trigger mode can be set as tapping the mode switch button 23 multiple times, tapping the mode switch button 23 one or more times and then holding the mode switch button 23, or holding the mode switch button 23 multiple times, such that the regular button function can be distinguished from the function extension button function of the mode switch button 23. It will be appreciated that, various reasonable or convenient trigger modes can be set to trigger various button functions of the multi-function button according to actual operation requirements.

The attitude acquisition device 53 can detect attitude information of the imaging device 400. In some instances, the attitude acquisition device 53 can be an inertial measurement unit (IMU) which comprises at least one of a gyroscope or an accelerometer.

The controller 52 can be electrically connected to buttons of the imaging device 400 (for example, the function extension button 51 and one or more other buttons) to detect a triggering of the buttons of the imaging device 400. Alternatively, the triggering of the buttons of the imaging device 400 can be detected by providing a button detection device, such as a signal sensing circuit.

The controller 52 can detect a triggering of one or more other buttons of the imaging device 400 or obtain the attitude information of the imaging device 400 detected by the attitude acquisition device 53 when the function extension button 51 is triggered.

The controller 52 can control the imaging device 400 (for example, the camera 42 of the imaging device 400) to perform an extended function based upon a combination of the function extension button 51 and the obtained attitude information when the obtained attitude information of the imaging device 400 (for example, the obtained attitude information of the gimbal 41 of the imaging device 400) is preset attitude information.

In some embodiments, the controller 52 can control the imaging device 400 to perform an extended function based upon a preset correspondence between (1) a combination of the function extension button 51 and each of at least one type of preset attitude information of the imaging device 400 and (2) extended functions of the imaging device 400. The correspondence can be stored in a memory (not shown) of the imaging device 400 in advance.

In some instances, the controller 52 can adjust an operating parameter of the imaging device 400 based upon a combination of the function extension button 51 and the obtained attitude information. For example, an operating parameter of the camera 42 can be adjusted by triggering the function extension button 51 and altering an attitude of the gimbal 41 after locking an attitude of the camera 42 using the gimbal 41.

In some embodiments, the at least one type of preset attitude information of the imaging device 400 can comprise at least one of a rotation angle of the gimbal about a pitch axis P (as shown in FIG. 3), a rotation angle of the gimbal about a roll axis R (as shown in FIG. 2), or a rotation angle of the gimbal about a yaw axis Y.

In some instances, if the obtained attitude information is the rotation angle of the gimbal 41 about the pitch axis, then the controller 52 can adjust a first operating parameter of the imaging device 400 based upon a combination of the function extension button 51 and the obtained rotation angle of the gimbal 41 about the pitch axis. For example, if the gimbal 41 is rotated clockwise about the pitch axis, then the first operating parameter of the camera 42 can be increased or decreased. For example, if the gimbal 41 is rotated counterclockwise about the pitch axis, then the first operating parameter of the camera 42 can be decreased or increased.

Optionally, if the obtained attitude information is the rotation angle of the gimbal 41 about the roll axis, the controller 52 can adjust a second operating parameter of the imaging device 400 based upon a combination of the function extension button 51 and the obtained rotation angle of the gimbal 41 about the roll axis. For example, if the gimbal 41 is rotated clockwise about the roll axis, then the second operating parameter of the camera 42 can be increased or decreased. For example, if the gimbal 41 is rotated counterclockwise about the roll axis, then the second operating parameter of the camera 42 can be decreased or increased.

Optionally, if the obtained attitude information is the rotation angle of the gimbal 41 about the yaw axis, then the controller 52 can adjust a third operating parameter of the imaging device 400 based upon a combination of the function extension button 51 and the obtained rotation angle of the gimbal 41 about the yaw axis. For example, if the gimbal 41 is rotated clockwise about the yaw axis, then a third operating parameter of the camera 42 can be increased or decreased. For example, if the gimbal 41 is rotated counterclockwise about the yaw axis, then the third operating parameter of the camera 42 can be decreased or increased.

In some embodiments, the first operating parameter, the second operating parameter and the third operating parameter can each be a focal length of the camera, an optical/digital zooming parameter, an aperture parameter, a shutter speed or a sensitivity. The first operating parameter, the second operating parameter and the third operating parameter can be different from one another. In other embodiments, the first operating parameter, the second operating parameter and the third operating parameter can be other parameters of the camera.

The controller 52 can control the imaging device 400 (for example, the camera 42 of the imaging device 400) to perform an extended function based upon a combination of the function extension button and one or more other buttons if the one or more other buttons are detected to be triggered.

In some embodiments, the controller 52 can control the imaging device 400 to perform an extended function based upon a preset correspondence between (1) a combination of the function extension button 51 and each of at least one other button of the imaging device 400 and (2) extended functions of the imaging device 400. The correspondence can be stored in a memory (not shown) of the imaging device 400 in advance.

In some embodiments, the at least one other button of the imaging device 400 can comprise at least one of a shutter button, a record button or a joystick. As shown in FIG. 3, the shutter button, the record button and the joystick can be the shutter button 24, the record button 25 and the joystick 26 provided to the gimbal 20. In other embodiments, the shutter button, the record button and the joystick can be provided to the camera.

In some instances, if the triggered button is the shutter button, then the controller 52 can enable or disable a first specific function of the imaging device 400 based upon a combination of the function extension button 51 and the triggered shutter button.

Optionally, if the triggered button is the record button, then the controller 52 can enable or disable a second specific function of the imaging device 400 based upon a combination of the function extension button 51 and the triggered record button.

In some embodiments, the first specific function and the second specific function can each be a flashlight, a shutter, a filter or a facial recognition of the camera. The first specific function and the second specific function can be different from each other. Alternatively, the first specific function and the second specific function can each be another function of the camera.

Optionally, if the triggered button is the joystick, then the controller 52 can adjust an operating parameter of the imaging device 400 based upon a combination of the function extension button 51 and the triggered joystick.

In some embodiments, the joystick can comprise an up button, a down button, a left button and a right button. In some instances, if the triggered button is the up button of the joystick, then the controller 52 can increase or decrease a fourth operating parameter of the imaging device 400 based upon a combination of the function extension button 51 and the triggered up button of the joystick. Alternatively or additionally, if the triggered button is the down button of the joystick, the controller 52 can decrease or increase the fourth operating parameter of the imaging device 400 based upon a combination of the function extension button 51 and the triggered down button of the joystick. In this way, an operating parameter of the imaging device 400 can be adjusted using the up button and the down button of the joystick collectively.

Optionally, if the triggered button is the left button of the joystick, then the controller 52 can increase or decrease a fifth operating parameter of the imaging device 400 based upon a combination of the function extension button and the triggered left button of the joystick. Alternatively or additionally, if the triggered button is the right button of the joystick, then the controller 52 can decrease or increase the fifth operating parameter of the imaging device 400 based upon a combination of the function extension button 51 and the triggered right button of the joystick. In this way, an operating parameter of the imaging device 400 can be adjusted using the left button and the right button of the joystick collectively.

In some instances, the fourth operating parameter and the fifth operating parameter can each be a focal length of the camera, an optical/digital zooming parameter, an aperture parameter, a shutter speed or a sensitivity. The fourth operating parameter and the fifth operating parameter can be different from each other. Alternatively, the fourth operating parameter and the fifth operating parameter can each be another parameter of the camera.

It will be appreciated that, the number of the button combination can be increased, and the extended functions of the imaging device 400 can be accordingly set according to actual requirements. For example, the shutter button and the record button, or a combination of one or more other buttons, can be simultaneously pressed when the function extension button 51 is triggered, such that more functions of the imaging device 400 can be enabled or disabled, or more operating parameters of the imaging device 400 can be adjusted.

In some embodiments, if the function extension button is triggered and meanwhile one or more other buttons are detected to be triggered or the preset attitude information of the imaging device 400 is obtained by the attitude acquisition device 53, the controller 52 can control the imaging device 400 (for example, the camera 42) to perform an extended function based upon a combination of the function extension button 51 and the obtained attitude information or a combination of the function extension button 51 and the one or more one or more other buttons. In other words, in order to control the imaging device 400 to perform an extended function, the function extension button can be triggered and meanwhile an attitude of the imaging device 400 can be altered. Alternatively, in order to control the imaging device to perform an extended function, the function extension button can be triggered and meanwhile one or more other buttons can be triggered.

Alternatively, the controller 52 can switch a control mode of the imaging device 400 (for example, the camera 42) to a function extension mode after the function extension button 51 is triggered. When the imaging device 400 is in the function extension mode, if the preset attitude information of the imaging device 400 is obtained or one or more other buttons are detected to be triggered, then the controller 52 can control the imaging device 400 (for example, the camera 42) to perform an extended function based upon a combination of the function extension button 51 and the obtained attitude information or a combination of the function extension button 51 and the one or more other buttons. In other words, in order to control the imaging device 400 to perform an extended function, the function extension button 51 can be triggered and meanwhile an attitude of the imaging device 400 can be altered. Alternatively, in order to control the imaging device to perform an extended function, the function extension button 51 can be triggered and meanwhile one or more other buttons can be triggered.

In some embodiments, the function extension button 51 and one or more other buttons can be provided at the gimbal 41, such as on a handle of the handheld gimbal. In this way, a user can grip the handle of the gimbal and conveniently invoke extended functions of the camera 62 by operating the function extension button and the one or more other buttons or altering an attitude of the gimbal. In some instances, at least one of the controller 52 and the attitude acquisition device 53 can be provided at the gimbal 41.

Alternatively, one or more of the function extension button 51, the other button, the controller 52 and the attitude acquisition device 53 can be provided at the camera 42.

Additional control modes on additional functions of the imaging device 400 can be provided using the control apparatus 50 in accordance with embodiments of the disclosure, in which a Fn button function mode is enabled by the function extension button 51, and the function extension button is combined with original physical buttons of the imaging device 400 or with the attitude information of the imaging device 400 (e.g., motion data of the imaging device 400). Additional functions of the imaging device 400 can be provided, and an utilization of the original buttons of the imaging device 400 can be improved. An operation of the imaging device 400 can be simplified, thereby improving an user experience. Furthermore, an upgrade and a functional extension of the imaging device 400 can be facilitated.

The embodiments as discussed hereinabove are intended to merely illustrate rather than limit the disclosure. While preferred embodiments of the disclosure have been shown and described herein, numerous variations and substitutions will occur to those skilled in the art without departing from the scope of the disclosure.

What is claimed is:

1. A method of controlling an imaging device having a function extension button, comprising:
    detecting that the function extension button of the imaging device is triggered, the imaging device including a gimbal and a camera carried by the gimbal;
    obtaining attitude information of the imaging device;
    controlling the imaging device to perform an extended function based upon a combination of the function extension button and the obtained attitude information in response to the obtained attitude information being preset attitude information, wherein controlling the imaging device to perform the extended function includes controlling the imaging device to perform the extended function based upon a preset correspondence between:
        a combination of the function extension button and one of at least one type of preset attitude information, the at least one type of preset attitude information of the imaging device including at least one of a rotation angle of the gimbal about a pitch axis, a rotation angle of the gimbal about a roll axis, or a rotation angle of the gimbal about a yaw axis; and
        the extended function of the imaging device; and
    adjusting an operating parameter of the imaging device based upon the combination of the function extension button and the obtained attitude information, including at least one of:
        adjusting a first operating parameter of the imaging device based upon a combination of the function extension button and the obtained rotation angle of the gimbal about the pitch axis in response to the obtained attitude information including the rotation angle of the gimbal about the pitch axis;
        adjusting a second operating parameter of the imaging device based upon a combination of the function extension button and the obtained rotation angle of the gimbal about the roll axis in response to the obtained attitude information including the rotation angle of the gimbal about the roll axis; or
        adjusting a third operating parameter of the imaging device based upon a combination of the function extension button and the obtained rotation angle of the gimbal about the yaw axis in response to the obtained attitude information including the rotation angle of the gimbal about the yaw axis,
    wherein each of the first operating parameter, the second operating parameter, and the third operating parameter includes a focal length of the camera, an optical/digital zooming parameter, an aperture parameter, a shutter speed, or a sensitivity, and the first operating parameter, the second operating parameter, and the third operating parameter are different from one another.

2. The method of claim 1, wherein controlling the imaging device to perform the extended function includes:
    controlling the imaging device to perform the extended function based upon the combination of the function extension button and the obtained attitude information in response to the function extension button being triggered and meanwhile the preset attitude information of the imaging device being obtained.

3. The method of claim 1, further comprising:
    switching a control mode of the imaging device to a function extension mode after the function extension button is triggered;
    wherein the extended function is performed after the imaging device is switched to the function extension mode.

4. The method of claim 1,
    wherein the function extension button includes a button having a single button function or a multi-function button having multiple button functions;

the method further comprising:
setting a specific trigger mode for triggering a function extension button function of the multi-function button; and
setting a preset trigger mode for triggering a regular button function of the multi-function button.

5. The method of claim 1, wherein:
controlling the imaging device to perform the extended function includes controlling the camera of the imaging device to perform the extended function; and/or
obtaining the attitude information of the imaging device includes obtaining attitude information of the gimbal of the imaging device.

6. An apparatus for controlling an imaging device, comprising:
a function extension button coupled to the imaging device, the imaging device including a gimbal and a camera carried by the gimbal;
an attitude acquisition device configured to detect attitude information of the imaging device; and
a controller configured to:
detect that the function extension button is triggered;
obtain the attitude information of the imaging device detected by the attitude acquisition device;
control the imaging device to perform an extended function based upon a combination of the function extension button and the obtained attitude information in response to the obtained attitude information being preset attitude information, wherein the controller is further configured to control the imaging device to perform the extended function based upon a preset correspondence between:
a combination of the function extension button and one of at least one type of preset attitude information, the at least one type of preset attitude information of the imaging device including at least one of a rotation angle of the gimbal about a pitch axis, a rotation angle of the gimbal about a roll axis, or a rotation angle of the gimbal about a yaw axis; and
the extended function of the imaging device; and
adjust an operating parameter of the imaging device based upon the combination of the function extension button and the obtained attitude information, wherein the controller is configured to perform at least one of:
adjusting a first operating parameter of the imaging device based upon a combination of the function extension button and the obtained rotation angle of the gimbal about the pitch axis in response to the obtained attitude information including the rotation angle of the gimbal about the pitch axis;
adjusting a second operating parameter of the imaging device based upon a combination of the function extension button and the obtained rotation angle of the gimbal about the roll axis in response to the obtained attitude information including the rotation angle of the gimbal about the roll axis; or
adjusting a third operating parameter of the imaging device based upon a combination of the function extension button and the obtained rotation angle of the gimbal about the yaw axis in response to the obtained attitude information including the rotation angle of the gimbal about the yaw axis,
wherein each of the first operating parameter, the second operating parameter, and the third operating parameter includes a focal length of the camera, an optical/digital zooming parameter, an aperture parameter, a shutter speed, or a sensitivity, and the first operating parameter, the second operating parameter, and the third operating parameter are different from one another.

7. The apparatus of claim 6, wherein the controller is further configured to control the imaging device to perform the extended function based upon the combination of the function extension button and the obtained attitude information in response to the function extension button being triggered and meanwhile the preset attitude information of the imaging device being obtained.

8. The apparatus of claim 6, wherein the controller is further configured to:
switch a control mode of the imaging device to a function extension mode after the function extension button is triggered; and
control the imaging device to perform the extended function after the imaging device is switched to the function extension mode.

9. The apparatus of claim 6, wherein:
one or more of the function extension button, the attitude acquisition device and the controller are provided at the gimbal or the camera.

10. The apparatus of claim 6, wherein the attitude acquisition device includes an inertial measurement unit (IMU) including a gyroscope and an accelerometer.

11. An imaging device comprising:
a gimbal;
a camera carried by the gimbal; and
a control apparatus including:
a function extension button;
an attitude acquisition device configured to detect attitude information of the imaging device; and
a controller configured to:
detect that the function extension button is triggered;
obtain the attitude information of the imaging device detected by the attitude acquisition device; and
control the imaging device to perform an extended function based upon a combination of the function extension button and the obtained attitude information in response to the obtained attitude information being preset attitude information, wherein the controller is further configured to control the imaging device to perform the extended function based upon a preset correspondence between:
a combination of the function extension button and one of at least one type of preset attitude information, the at least one type of preset attitude information of the imaging device including at least one of a rotation angle of the gimbal about a pitch axis, a rotation angle of the gimbal about a roll axis, or a rotation angle of the gimbal about a yaw axis; and
the extended function of the imaging device; and
adjust an operating parameter of the imaging device based upon the combination of the function extension button and the obtained attitude information, wherein the controller is configured to perform at least one of:
adjusting a first operating parameter of the imaging device based upon a combination of the function extension button and the obtained rotation angle of the gimbal about the pitch axis in response to the obtained attitude information including the rotation angle of the gimbal about the pitch axis;

adjusting a second operating parameter of the imaging device based upon a combination of the function extension button and the obtained rotation angle of the gimbal about the roll axis in response to the obtained attitude information including the rotation angle of the gimbal about the roll axis; or adjusting a third operating parameter of the imaging device based upon a combination of the function extension button and the obtained rotation angle of the gimbal about the yaw axis in response to the obtained attitude information including the rotation angle of the gimbal about the vaw axis, wherein each of the first operating parameter, the second operating parameter, and the third operating parameter includes a focal length of the camera, an optical/digital zooming parameter, an aperture parameter, a shutter speed, or a sensitivity, and the first operating parameter, the second operating parameter, and the third operating parameter are different from one another.

\* \* \* \* \*